Nov. 15, 1949   E. C. DAMROW   2,488,053
CURD TREATING APPARATUS
Filed Oct. 28, 1946   2 Sheets-Sheet 1
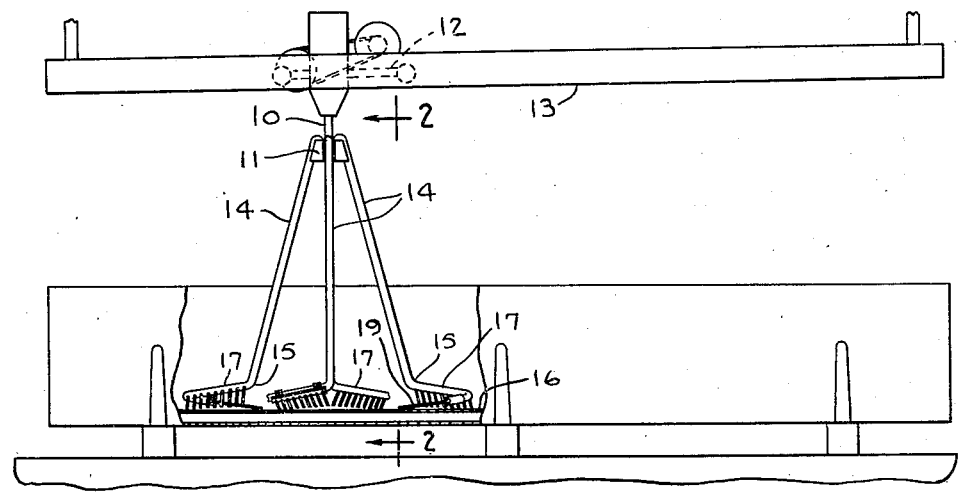
FIG. 1
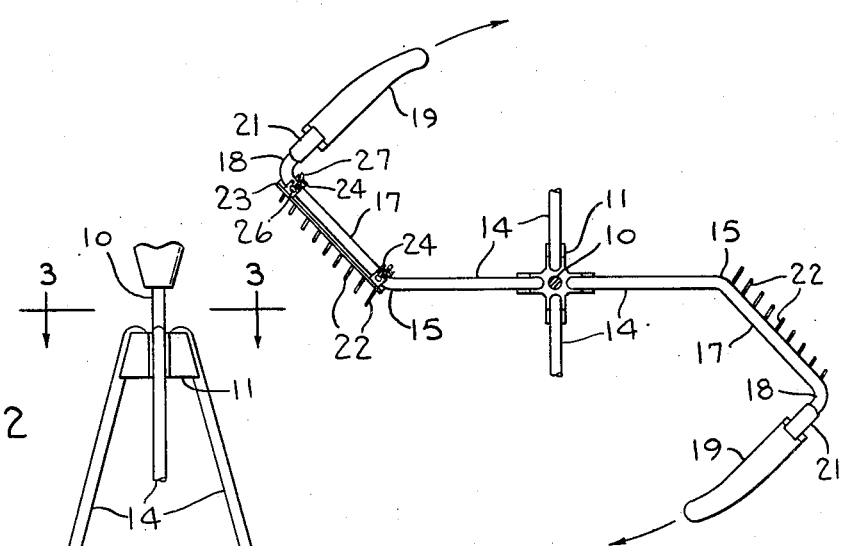
FIG. 2
FIG. 3
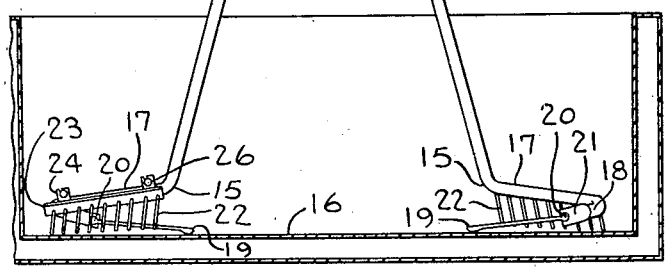
INVENTOR.
Edward C. Damrow
BY
Quarles & French
ATTORNEYS Nov. 15, 1949 — E. C. DAMROW — 2,488,053
CURD TREATING APPARATUS
Filed Oct. 28, 1946 — 2 Sheets-Sheet 2

INVENTOR.
Edward C. Damrow
BY
Charles French
ATTORNEYS

Patented Nov. 15, 1949

2,488,053

UNITED STATES PATENT OFFICE 2,488,053

CURD TREATING APPARATUS

Edward C. Damrow, Fond du Lac, Wis., assignor to Damrow Brothers Company, Fond du Lac, Wis., a corporation of Wisconsin Application October 28, 1946, Serial No. 706,107

3 Claims. (Cl. 31—48)

The invention relates to curd treating apparatus.

In my prior U. S. Patent No. 2,086,353, dated July 6, 1937, there is disclosed an apparatus for forking curd in which the arms of the fork have loosely pivotally mounted at their lower ends what may be termed blades, plows, shovels, or forks which are moved over the bottom of the curd vat in rotary paths as the whole fork is moved back and forth relative to the vat to assist in lifting and turning over the milled curd in the vat to permit the escape of gas and whey. This fork eliminated much of the back breaking manual labor of forking the curd after it had been milled. In the making of granulated curd, the curd cannot be allowed to mat after it has been cut with curd knives. Formerly this was prevented by means of stirring by manual means. The object of the present invention is to combine with the bottom forks a means built into or attached to the arms of the fork so as to be operated thereby and thus further eliminate manual labor in the making of a granulated type of cheese curd.

The invention further consists in the several features hereinafter set forth and more particularly defined by claims at the conclusion hereof.

In the drawings:

Fig. 1 is a perspective view of my improved curd treating apparatus, parts being broken away and parts being shown in section;

Fig. 2 is a detailed vertical sectional view taken on the line 2—2 of Fig. 1;

Fig. 3 is a detailed horizontal sectional view taken on the line 3—3 of Fig. 2;

Figure 4:
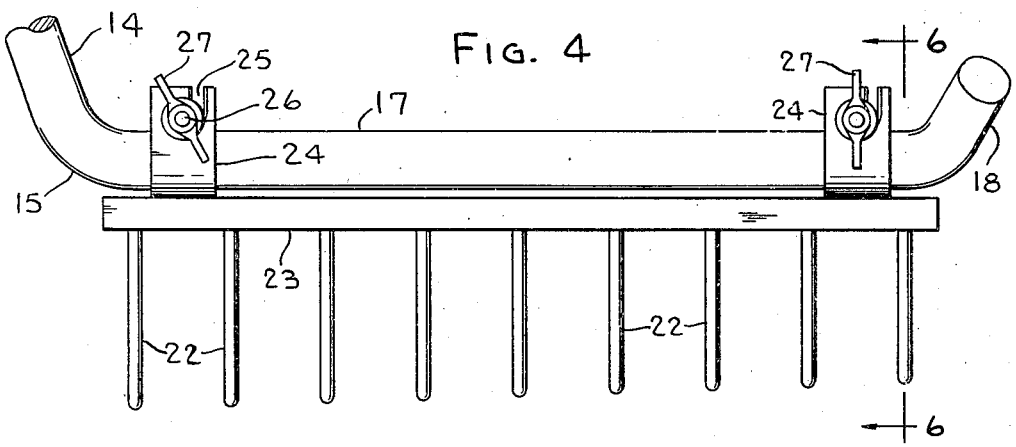
Fig. 4 is a detailed elevation view of a part of one of the fork arms.

Referring to the drawings, the curd treating device comprises a rotatable support 10 upon which a head 11 is detachably and adjustably mounted by a frictional fit or other suitable means of adjustment. The support 10 as in the aforementioned patent is mounted on a carriage 12 movable back and forth on an overhead track 13 while the support is being rotated.

Arms 14 are secured to the head 11 and incline radially outwardly and downwardly therefrom to a point 15 above the bottom of the curd vat 16 and then extend downwardly and at an obtuse angle on the advancing side from the general plane of the arms to provide a section 17 from which an end portion 18 inclines slightly downwardly and at right angles to advancing side of said arms.

Blades, shovels, plows, or forks 19 similar to those of my prior patent are loosely and swingingly pivotally mounted at 20 in socket members 21 on the end portions 18.

Each fork or blade 19 is of greater length than width and being pivoted at one end, its center of gravity is beyond the pivot, so that its forward end is gravitationally in contact with the bottom of the cheese vat and, while in operation, passes along the bottom of said vat and also to some extent above the same and plows, forks, or shovels the curd body in curvilinear lines as it progresses back and forth in a rotary movement from end to end of the vat. As the blades travel in a circular or curved path from side to side of the vat, the forward end of each blade, in contact with the bottom of the vat, passes under the curd and close to the sides of the vat, thus ploughing the curd from the bottom and sides of the vat, lifting it bodily, after which the curd rolls off and away from both sides of the curved line of travel of the blade, and almost immediately the curd is again ploughed up and turned over by a succeeding fork. Thus the curd is continually lifted from the bottom and turned over as long as the support 10 is rotated.

Figure 5:
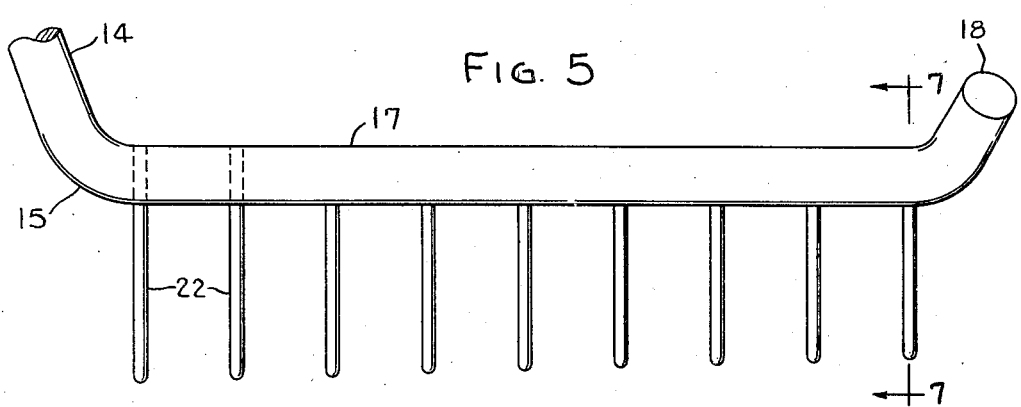
Fig. 5 is a detailed elevation view similar to Fig. 4 showing certain modifications.
Figure 6:
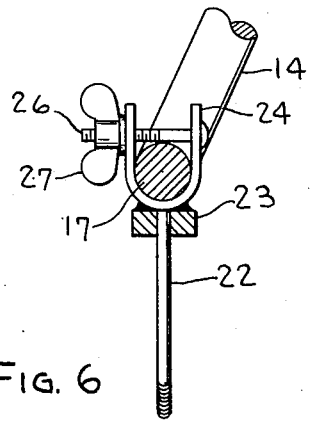
Fig. 6 is a detailed vertical sectional view taken on the line 6—6 of Fig. 4.
Figure 7:
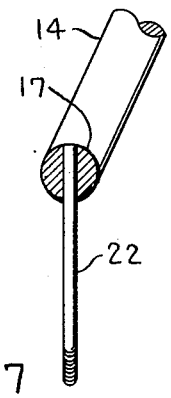
Fig. 7 is a detailed vertical sectional view taken on the line 7—7 of Fig. 5.
Figure 8:
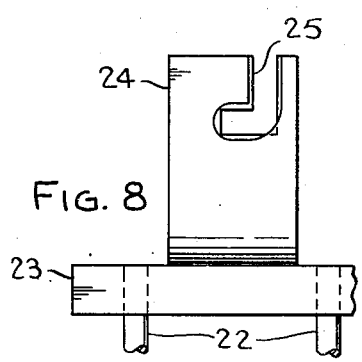
Fig. 8 is a detailed front elevation view of parts shown in Fig. 4, parts being broken away.

The above described operation of the lifting blades 19 is similar to that of the previously referred to patent, but in practice it has been found that this action has to be supplemented by further treatment of the curd to prevent it from matting if a granulated type of cheese curd is desired, and for this purpose the shape of the arms 14 have been modified so as to provide the sections 17 which are either provided with a plurality of tines 22 secured directly thereto to form a rake whose tines extend downwardly and slightly rearwardly from the trailing edge of each section, as shown in Figs. 1 to 3, 5 and 7, or said tines may be secured to a separate bar or back 23 which in turn is detachably secured to the section 17 by U-shaped metal clamping clips 24 whose legs have bayonet joint type slots 25 receiving a clamping screw 26 drawn into clamping engagement therewith by a wing nut 27.

It will be noted that Figs. 1 to 3 of the drawings are composite views showing both the built in and detachable rakes, but it will be understood that either one or the other of these rake forms is used in practice.

With the above arrangement as the arms 14 are rotated and moved lengthwise of the vat, the forks 19 lift the curd from the bottom of the vat and from the sides, and the rakes formed by the tines 22 pass through the curd thus lifted and also through that portion of the curd out of the sphere of action of the blades 19, and thus the curds are kept separated and are effectively prevented from matting together. The rakes produce a greater agitating effect than is possible with the blades 19 alone.

I desire it to be understood that this invention is not to be limited to any particular form or arrangement of parts except in so far as such limitations are included in the claims.

What I claim as my invention is:

1. In a cheese making apparatus, a revoluble overhead support having a plurality of radially disposed arms having downwardly extending outwardly diverging main portions and lower end portions inclining further outwardly and downwardly from the main portions of said arms, a loosely pivoted forking blade carried by the outer end of said lower end portions of each arm, and rake tines on the said lower end portions of said arms and projecting downwardly therefrom into the same horizontal planes as those traversed by said blades and acting in conjunction with said blades to prevent matting of the curd.

2. In a cheese making apparatus, a revoluble overhead support having a vertically disposed axis and having a plurality of radially disposed arms having downwardly extending outwardly diverging main portions and lower end portions diverging further outwardly from the axis of said support and also downwardly at a slight inclination relative to the horizontal, a forking blade mounted at the outer end of said lower end portion of each arm, and rake means detachably mounted on said lower end portions of said arms having tines disposed in the same horizontal planes as those traversed by said blades.

3. In a cheese making apparatus, a revoluble overhead support having a plurality of radially disposed arms having downwardly extending outwardly diverging main portions and lower end portions, each including a section angled outwardly and forwardly from said main portion of the arm as considered in its direction of rotation and also including downwardly from the main body of the arm at an acute angle from the horizontal and having a forwardly directed angled end, a forking blade loosely pivotally mounted at its back end in said angled end, and rake means on said lower end portion of each arm with the tines projecting rearwardly and downwardly from the trailing side of said end portion in the same horizontal planes as those traversed by said blade.

EDWARD C. DAMROW.

REFERENCES CITED

The following references are of record in the file of this patent:

UNITED STATES PATENTS

| Number | Name | Date |
|---|---|---|
| 64,614 | Wise et al. | May 7, 1867 |
| 1,611,854 | Damrow | Dec. 21, 1926 |
| 1,728,637 | Stoelting | Sept. 17, 1929 |
| 2,086,353 | Damrow | July 6, 1937 |

FOREIGN PATENTS

| Number | Country | Date |
|---|---|---|
| 8,092 | Netherlands | Nov. 15, 1921 |

Certificate of Correction

Patent No. 2,488,053 November 15, 1949

EDWARD C. DAMROW

It is hereby certified that error appears in the printed specification of the above numbered patent requiring correction as follows:

Column 4, line 14, for the word "including" read *inclining*;

and that the said Letters Patent should be read with this correction therein that the same may conform to the record of the case in the Patent Office.

Signed and sealed this 7th day of March, A. D. 1950.

[SEAL]

THOMAS F. MURPHY,
*Assistant Commissioner of Patents.*